(12) United States Patent
Hara et al.

(10) Patent No.: US 12,122,454 B2
(45) Date of Patent: Oct. 22, 2024

(54) VEHICLE FRONT PORTION STRUCTURE (71) Applicant: TOYOTA JIDOSHA KABUSHIKI KAISHA, Toyota (JP)

(72) Inventors: Yasuhiro Hara, Nagoya (JP); Norimasa Koreishi, Miyoshi (JP); Jumpei Watanabe, Nagakute (JP); Hirotaka Ishioka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 17/840,764

(22) Filed: Jun. 15, 2022

(65) Prior Publication Data
US 2022/0402557 A1 Dec. 22, 2022

(30) Foreign Application Priority Data
Jun. 22, 2021 (JP) .................. 2021-103555

(51) Int. Cl.
| B62D 25/20 | (2006.01) |
| B60K 1/04 | (2019.01) |
| B60N 2/01 | (2006.01) |
| B60N 2/015 | (2006.01) |
| B62D 25/08 | (2006.01) |
| B62D 25/14 | (2006.01) |

(52) U.S. Cl.
CPC .............. *B62D 25/085* (2013.01); *B60K 1/04* (2013.01); *B60N 2/012* (2013.01); *B62D 25/14* (2013.01); *B62D 25/20* (2013.01)

(58) Field of Classification Search
CPC ............... B62D 25/20; B62D 25/2009; B62D 25/2027; B62D 25/2036; B62D 25/2045; B60N 2/012
USPC ........................ 296/24.4, 24.43, 24.44, 24.46
See application file for complete search history.

(56) References Cited

U.S. PATENT DOCUMENTS

| 6,286,882 B1 * | 9/2001 | Rastetter | ................. F41H 7/048 296/24.41 |
| 6,902,020 B2 * | 6/2005 | Kronner | ................. B60R 16/04 180/68.5 |
| 11,370,287 B2 * | 6/2022 | Tsuyuzaki | ............ B62D 21/157 |

(Continued)

FOREIGN PATENT DOCUMENTS

| DE | 102018113529 A1 | 12/2018 |
| DE | 102019121250 A1 | 2/2020 |

(Continued)

*Primary Examiner* — Gregory A Blankenship
(74) *Attorney, Agent, or Firm* — Dinsmore & Shohl LLP (57) ABSTRACT A vehicle front portion structure includes: a dash panel separating a power unit compartment provided at a lower portion of a vehicle front portion from a cabin; a partition wall having a lower end portion secured to a vehicle rear end portion of the dash panel and extending in a vehicle upward direction to divide the cabin into a front portion and a rear portion; a front portion vehicle seat disposed on the dash panel; a seat support member supporting the front portion vehicle seat from a vehicle lower side and having a front end portion secured to the dash panel and a rear end portion secured to the partition wall; and an autonomous driving unit, at least part of the autonomous driving unit being disposed in an area surrounded by the dash panel, the partition wall, and the seat support member.

7 Claims, 3 Drawing Sheets (56) References Cited

U.S. PATENT DOCUMENTS

| | | | |
|---|---|---|---|
| 2013/0168177 A1* | 7/2013 | Takagi | B62D 23/005 |
| | | | 180/68.5 |
| 2016/0137226 A1* | 5/2016 | Wolf | B62D 25/20 |
| | | | 296/203.01 |
| 2018/0354444 A1 | 12/2018 | Sundararajan et al. | |
| 2020/0062135 A1 | 2/2020 | Hara et al. | |
| 2020/0070671 A1* | 3/2020 | Ohkuma | B60K 1/04 |
| 2020/0148136 A1* | 5/2020 | Takei | B60W 40/08 |
| 2020/0377154 A1* | 12/2020 | Kim | H01M 50/244 |
| 2021/0245702 A1* | 8/2021 | Watanabe | B60R 22/12 |
| 2021/0245815 A1* | 8/2021 | Watanabe | B62D 25/2027 |
| 2021/0339617 A1* | 11/2021 | Ohkuma | H01M 50/242 |
| 2022/0126773 A1* | 4/2022 | Yagi | B60N 2/686 |
| 2022/0402404 A1* | 12/2022 | Hara | B62D 25/20 |
| 2022/0402551 A1* | 12/2022 | Hara | B62D 47/02 |
| 2022/0402553 A1* | 12/2022 | Hara | B62D 25/20 |
| 2022/0402556 A1* | 12/2022 | Hara | B62D 25/14 |
| 2022/0402557 A1* | 12/2022 | Hara | B60N 2/012 |
| 2022/0402560 A1* | 12/2022 | Hara | B62D 25/20 |

FOREIGN PATENT DOCUMENTS

| | | | |
|---|---|---|---|
| JP | 2020-078985 A | 5/2020 | |
| JP | 6856150 B1 * | 4/2021 | B60R 21/026 |

\* cited by examiner

VEHICLE FRONT PORTION STRUCTURE

CROSS-REFERENCE TO RELATED APPLICATION

This application claims priority under 35 USC 119 from Japanese Patent Application No. 2021-103555 filed on Jun. 22, 2021, the disclosure of which is incorporated by reference herein in its entirety.

BACKGROUND

Technical Field

The present disclosure relates to a vehicle front portion structure.

Related Art

In recent years advancements have been made in the development of autonomous vehicles. Autonomous vehicles have an autonomous driving unit mounted in them. In order for space used by users to not be reduced as a result of mounting the autonomous driving unit, a means is needed.

For example, Japanese Patent Application Laid-open (JP-A) No. 2020-78985 proposes a structure which, by disposing the autonomous driving unit (an autonomous driving device module) between a rear seat and a floor panel, allows the autonomous driving unit to be mounted in the vehicle without reducing space used by users.

SUMMARY

It is also necessary to protect the autonomous driving unit at the time of an impact. In this respect, the above mounting structure has room for improvement.

In consideration of the above circumstances, the present disclosure provides a vehicle front portion structure that has an ability to protect an autonomous driving unit at the time of an impact without reducing space used by users.

A vehicle front portion structure of a first aspect of the disclosure includes: a dash panel that separates a power unit compartment provided at a lower portion of a vehicle front portion from a cabin provided on a vehicle upper side and a vehicle rear side of the power unit compartment; a partition wall that has a lower end portion secured to a vehicle rear end portion of the dash panel and that extends from the lower end portion in a vehicle upward direction to divide the cabin into a front portion and a rear portion; a front portion vehicle seat that is disposed on a vehicle upper side of the dash panel; a seat support member that supports the front portion vehicle seat from a vehicle lower side and that has a front end portion secured to the dash panel and a rear end portion secured to the partition wall; and an autonomous driving unit at least part of the autonomous driving unit is disposed in an area surrounded by the dash panel, the partition wall, and the seat support member, and the autonomous driving unit controls autonomous driving of the vehicle.

The seat support member supports the front portion vehicle seat. The front portion vehicle seat is disposed on the vehicle upper side of the dash panel. The dash panel separates the power unit compartment provided at the lower portion of the vehicle front portion from the cabin provided on the vehicle upper side and the vehicle rear side of the power unit compartment. The seat support member has a front end secured to the dash panel and a rear end secured to the partition wall that partitions the cabin into a front portion and a rear portion. Furthermore, the lower end portion of the partition wall is secured to the vehicle rear end portion of the dash panel.

At least part of the autonomous driving unit is disposed in the area surrounded by the dash panel, the seat support member, and the partition wall.

In this way, the autonomous driving unit is disposed on the vehicle lower side of the seat support member in the front portion of the cabin, the cabin is partitioned into the front portion and the rear portion by the partition wall. The autonomous driving unit can be installed in the cabin without reducing space used by users of the vehicle.

Furthermore, because at least part of the autonomous driving unit is disposed in the area surrounded by the dash panel, the seat support member, and the partition wall, the ability of the vehicle front portion structure to protect the autonomous driving unit at the time of a frontal impact to the vehicle is provided.

In a vehicle front portion structure of a second aspect of the disclosure, in the vehicle front portion structure of the first aspect, an upper end portion of the partition wall is secured to a roof panel.

The upper end portion of the partition wall whose lower end is secured to the dash panel is secured to the roof panel, so the strength of the partition wall is improved and the ability of the vehicle front portion structure to protect the autonomous driving unit at the time of a frontal impact to the vehicle is improved even more.

In a vehicle front portion structure of a third aspect of the disclosure, in the vehicle front portion structure of the first aspect or the second aspect, the vehicle front portion structure further includes brackets, and the autonomous driving unit is supported by the brackets attached to a top of the dash panel.

In this vehicle front portion structure, the autonomous driving unit is supported by and disposed on the brackets attached to the dash panel. Consequently, the autonomous driving unit is inhibited from being vibrated by input from the road surface compared to a case where the autonomous driving unit is directly mounted on the dash panel.

A vehicle front portion structure of a fourth aspect of the disclosure, in the vehicle front portion structure of any of the first aspect to the third aspect, further includes: a dash panel reinforcement that is configured to interconnect, in a vehicle width direction, vehicle skeletal members extending in a vehicle front-rear direction on both sides in the vehicle width direction, the dash panel reinforcement supports a vehicle front end portion of the dash panel; and restraining members that extend in the vehicle front-rear direction and that have front end portions secured to the dash panel reinforcement and rear end portions secured to the autonomous driving unit.

In this vehicle front portion structure of the fourth aspect, the autonomous driving unit and the dash panel reinforcement, which interconnects in the vehicle width direction the skeletal members extending in the vehicle front-rear direction on both sides in the vehicle width direction, are interconnected by the restraining members extending in the vehicle front-rear direction.

Consequently, when the vehicle sustains a frontal impact, the autonomous driving unit is inhibited by the restraining members from being displaced in the vehicle forward direction, and the ability of the vehicle front portion structure to protect the autonomous driving unit is provided.

In a vehicle front portion structure of a fifth aspect of the disclosure, in the vehicle front portion structure of any of the first aspect to the fourth aspect, the dash panel slopes downward from the vehicle front side to the vehicle rear side.

In the vehicle front portion structure of the fifth aspect, the dash panel slopes downward from the vehicle front side to the vehicle rear side, so a wide space in which the autonomous driving unit is disposed can be ensured.

In a vehicle front portion structure of a sixth aspect of the disclosure, in the vehicle front portion structure of the third aspect, the brackets have front end portions that are attached to a vehicle front-rear direction middle position of the dash panel and rear end portions that are attached to the vehicle rear end portion of the dash panel.

In the vehicle front portion structure of the sixth aspect, the autonomous driving unit is disposed on the brackets that are attached to the vehicle front-rear direction middle position and the vehicle rear end portion of the dash panel. The autonomous driving unit is inhibited from being vibrated by input from the road surface compared to a case where the autonomous driving unit is directly mounted on the dash panel.

As described above, according to the vehicle front portion structure pertaining to the disclosure, the vehicle front portion structure has an ability to protect the autonomous driving unit at the time of an impact without reducing space used by users.

BRIEF DESCRIPTION OF THE DRAWINGS

An embodiment will be described in detail based on the following figures, wherein.

DETAILED DESCRIPTION

A vehicle front portion structure pertaining to an embodiment will now be described with reference to FIG. 1 to FIG. 3. In the drawings, arrow FR, arrow LH, and arrow UP indicate a vehicle forward direction (traveling direction), a vehicle leftward direction, and a vehicle upward direction, respectively. Below, unless otherwise specified, when description is given simply using the directions of front/rear, right/left, and upper/lower, these directions are to be understood as meaning front/rear in the vehicle front-rear direction, right/left in the vehicle right-left direction, and upper/lower in the vehicle up-down direction. Furthermore, in FIG. 2, illustration of a floor panel 44 is omitted for convenience of description.

Figure 1:
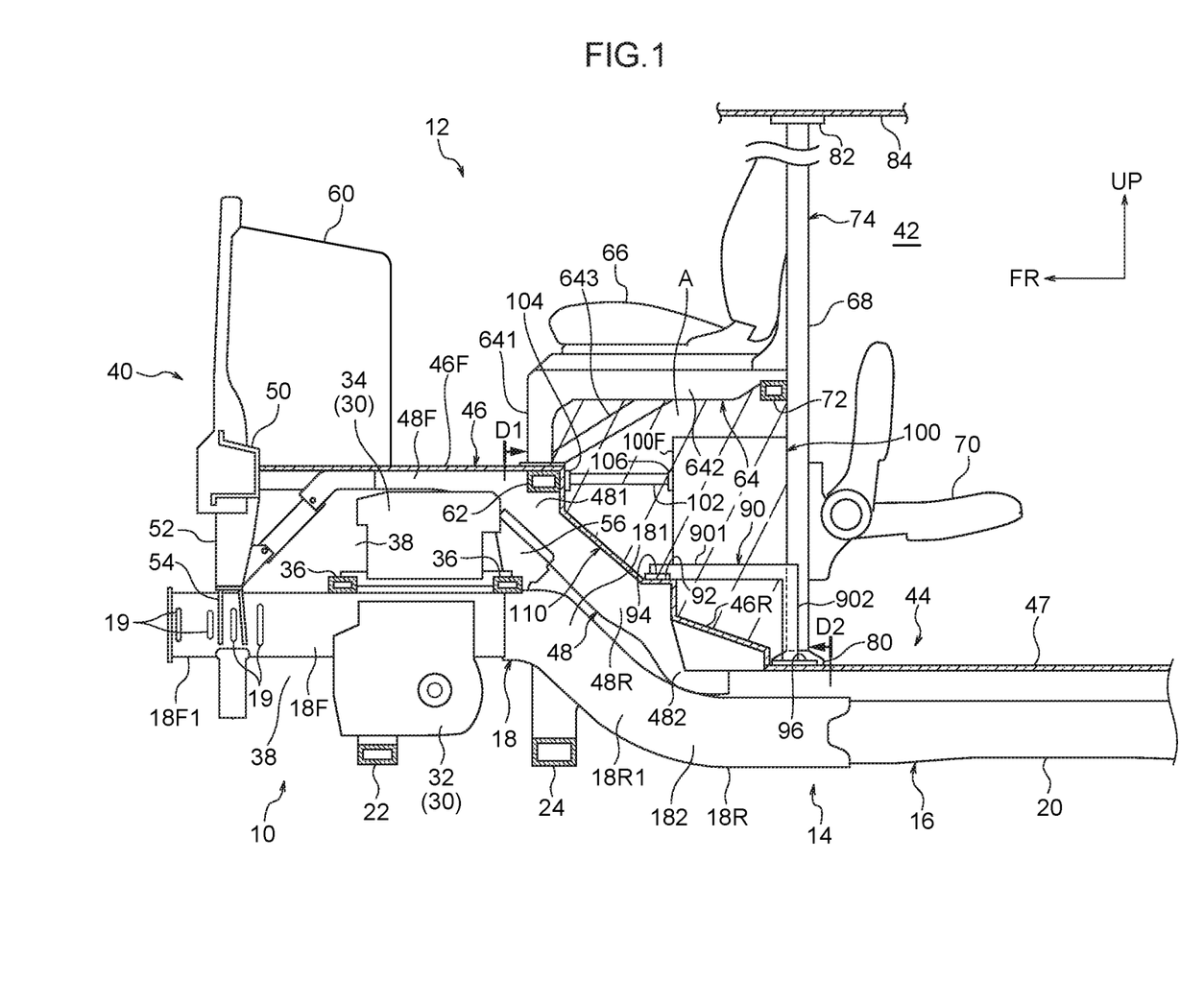
FIG. 1 is a sectional view of a partial configuration of a front portion of a vehicle to which a vehicle front portion structure pertaining to the embodiment has been applied, and the front portion has been cut slightly at the vehicle width direction central side from a front side frame on the vehicle left side.
Figure 2:
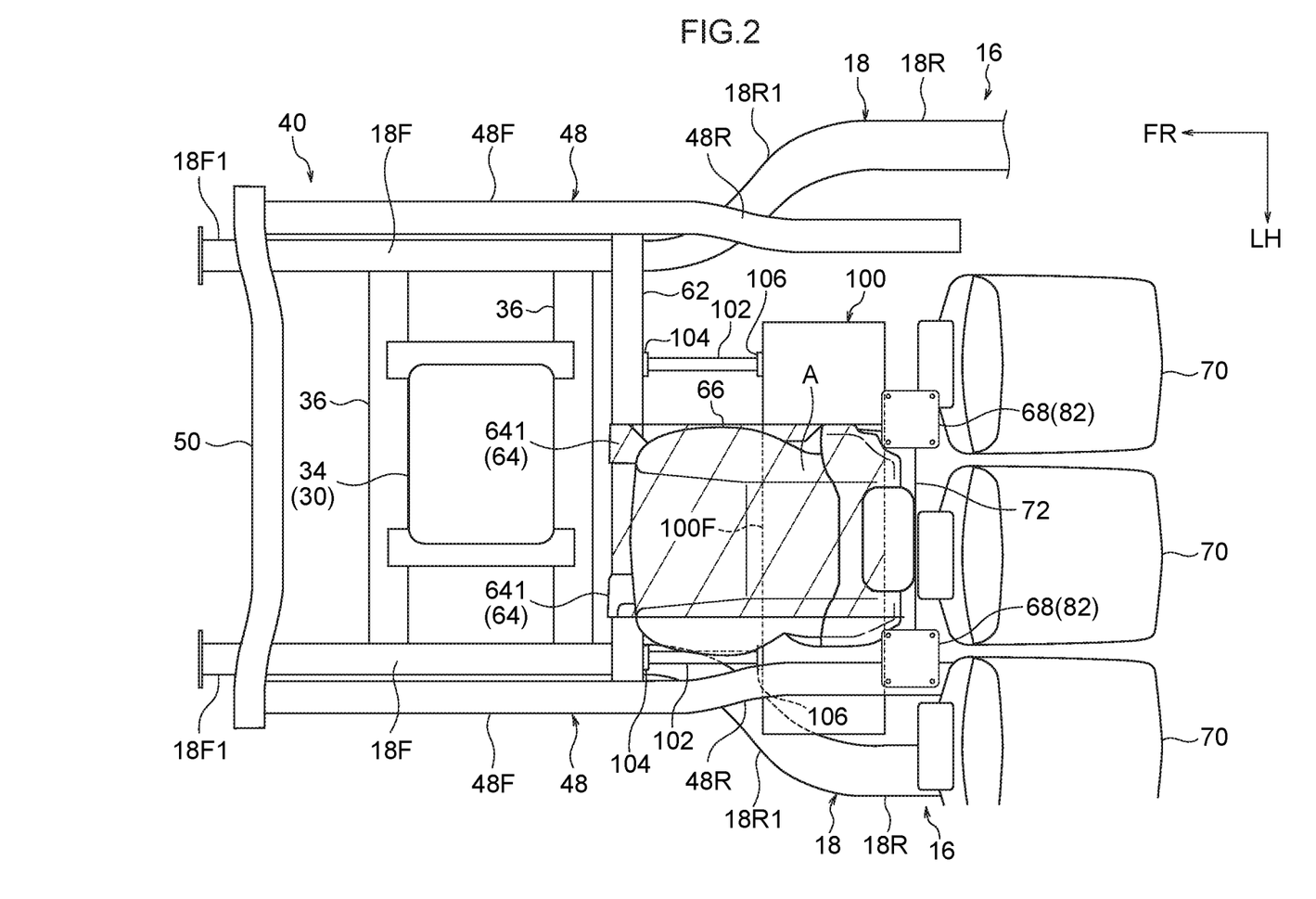
FIG. 2 is a plan view showing the partial configuration of the front portion of the vehicle.

As shown in FIG. 1 and FIG. 2, a vehicle 12 to which a vehicle front portion structure 10 pertaining to this embodiment has been applied is a frame car whose vehicle body 40 is supported by a ladder frame 14. The vehicle 12 is, as an example, a bus.

The vehicle body 40 of the vehicle 12 is substantially cuboidal in its outer shape. The vehicle 12 is, for example, an electric vehicle.

First, the skeletal structure of the vehicle 12 will be described.

As shown in FIG. 1 and FIG. 2, the ladder frame 14 has a right and left pair of side frames 16 and plural cross members 22, 24. The right and left side frames 16 extend in the front-rear direction on both sides in a width direction of the vehicle 12. The plural cross members 22, 24 are arranged side by side an interval apart from each other in the front-rear direction and extend in the vehicle width direction. The right-left side frames 16 are interconnected by the plural cross members 22, 24.

As shown in FIG. 1, each side frame 16 is configured by a front side frame 18, a middle side frame 20, and a rear side frame that is not shown in the drawings.

The right and left front side frames 18 extend in the front-rear direction on both sides in the vehicle width direction of the front portion of the vehicle 12. The right and left middle side frames 20 extend in the front-rear direction on both sides in the vehicle width direction of the front-rear direction middle portion of the vehicle 12. The right and left rear side frames extend in the front-rear direction on both sides in the vehicle width direction of the rear portion of the vehicle 12. The front side frames 18, the middle side frames 20, and the rear side frames are made of steel formed in the shape of a rectangular tube, for example, and have a closed cross-section when seen in the front-rear direction. Plural cross members not shown in the drawings are also provided between the right and left middle side frames 20 and between the right and left rear side frames.

Front portions 18F of the right and left front side frames 18 extend linearly in the front-rear direction. Front end portions of the front portions 18F are configured as deformation portions 18F1 that become axially compressed and deform in the front-rear direction at the time of a frontal impact to the vehicle 12. On the right and left side surfaces of each deformation portion 18F1, plural beads 19 that extend in the up-down direction as an example are formed side by side in the front-rear direction. This makes the deformation portions 18F1 weaker to loads in the front-rear direction than other parts of the front portions 18F. Front-rear direction middle portions of the front portions 18F are interconnected in the vehicle width direction by the cross member 22.

Front sections of rear portions 18R of the right and left front side frames 18 are configured as rocker portions 18R1 that slope downward from front to back, and rear sections of the rear portions 18R extend linearly in the front-rear direction. Each rear portion 18R is bent substantially in the shape of a crank at bend portions 181, 182 that are located at front and rear sides of the rocker portion 18R1. The bend portions 181 on the front side are bent so as to be upwardly and rearwardly convex, and the bend portions 182 on the rear side are bent so as to be downwardly and forwardly convex. Front portions of the right and left rocker portions 18R1 are interconnected in the vehicle width direction by the cross member 24. Front end portions of the right and left middle side frames 20 are bonded to rear end portions of the rear portions 18R.

Between the right and left front side frames 18, a motor 32 for driving the vehicle 12 is disposed. The motor 32 is supported by the right and left front side frames 18 via the cross members 22, 24 and support members not shown in the drawings. Above the motor 32, an electronic unit 34 that controls power supplied to the motor 32 is disposed. The electronic unit 34 is supported by the right and left front side frames 18 via support frames 36. The motor 32 and the electronic unit 34 configure a power unit 30.

The vehicle body 40, which is supported from below by the ladder frame 14, has a floor panel 44 that configures a floor of a cabin 42. The floor panel 44 includes a front floor panel 46 that configures the floor in a front portion of the cabin 42, a middle floor panel 47 that configures the floor in a front-rear direction middle portion of the cabin 42, and a rear floor panel (not shown in the drawings) that configures the floor in a rear portion of the cabin 42. The front floor panel 46, the middle floor panel 47, and the rear floor panel are configured by sheet steel, for example.

The area under the front floor panel 46 where the motor 32 and the electronic unit 34 are disposed is a power unit compartment 38.

The front portion of the front floor panel 46 is configured as a driver's seat floor portion 46F that extends in the front-rear direction and in the vehicle width direction. The rear portion of the front floor panel 46 is configured as a sloping portion 46R that slopes downward in the vehicle rearward direction.

The driver's seat floor portion 46F is disposed apart from, on the upper side of, the front portions 18F of the right and left front side frames 18, and the sloping portion 46R is disposed apart from, on the upper side of, the rear portions 18R of the right and left front side frames 18. The electronic unit 34 is disposed under the driver's seat floor portion 46F. The front end portion of the sloping portion 46R is joined to a seat cross member 62 described later. In other words, the front end portion of the sloping portion 46R is supported by the seat cross member 62. The rear end portion of the sloping portion 46R is bonded to the front end portion of the middle floor panel 47.

The middle floor panel 47 extends in the front-rear direction and in the vehicle width direction. Under the middle floor panel 47, a battery (not shown in the drawings) that stores the power for supply to the motor 32 is disposed.

The front floor panel 46 is supported by the right and left front side frames 18 via a right and left pair of front side members 48. The right and left front side members 48 extend in the front-rear direction on the upper sides and the vehicle width direction outer sides of the right and left front side frames 18. The front side members 48 correspond to "vehicle skeletal members".

The right and left front side members 48 are manufactured by stamping sheet steel, for example, and are joined to the undersurface of the front floor panel 46 by welding.

Front portions 48F of the right and left front side members 48 extend linearly in the front-rear direction and are joined to the undersurface of the driver's seat floor portion 46F. Rear portions 48R (sometimes called "rocker portions 48R" below) of the right and left front side members 48 are configured as rocker portions that slope downward in the vehicle rearward direction, and are joined to the undersurface of the sloping portion 46R of the front floor panel 46. Each rocker portion 48R is bent substantially in the shape of a crank at bend portions 481, 482 that are located at front and rear sides at the rocker portion 48R. The bend portions 481 on the front side are bent so as to be upwardly and rearwardly convex, and the bend portions 482 on the rear side are bent so as to be downwardly and forwardly convex.

On front end portions of the right and left front side members 48, a front cross member 50 that extends in the vehicle width direction is disposed. The front cross member 50 is made of sheet steel, for example, and has a hat-shaped cross-section that opens in the forward direction when seen in the vehicle width direction. The front end portions of the right and left front side members 48 are provided with flange portions that are superposed on the rear surface of the front cross member 50, for example, and the flange portions are secured to the rear surface of the front cross member 50 by fastening with bolts. Because of this, the front end portions of the right and left front side members 48 are interconnected in the vehicle width direction by the front cross member 50.

Both end portions in the vehicle width direction of the front cross member 50 are supported by the front end portions of the right and left front side frames 18 (i.e., the deformation portions 18F1) via right and left front pillar members 52. Lower end portions of the front pillar members 52 are secured to the front side frames 18 via brackets 54.

Front lower end portions of the rocker portions 48R of the right and left front side members 48 are supported by the right and left front side frames 18 via right and left rear pillar members 56. The rear pillar members 56, for example, have upper end portions on which are formed flange portions that are secured by welding to the front end portions of the rocker portions 48R. Lower end portions of the rear pillar members 56 are secured to the front side frames 18 via brackets not shown in the drawings.

The right and left front side members 48 are supported from below by the front side frames 18 via the front cross member 50, the front pillar members 52, the brackets 54, the rear pillar members 56, and the brackets (not shown in the drawings). Additionally, the front floor panel 46 is supported from below by the front side members 48. An instrument panel 60 is placed on and secured to the upper surface of the front portion of the front floor panel 46.

Front upper end portions of the rocker portions 48R of the right and left front side members 48 are interconnected in the vehicle width direction by a seat cross member 62. The seat cross member 62 is made of sheet steel formed in the shape of a rectangular tube, for example, and extends in the vehicle width direction. Both end portions in the vehicle width direction of the seat cross member 62 are bonded to the front upper end portions of the rocker portions 48R by welding. The rear end portion of the driver's seat floor portion 46F is bonded by welding to the upper surface of the seat cross member 62. Furthermore, the seat cross member 62 supports, from below, the front end portion of a seat frame 64.

The seat cross member 62 corresponds to a "dash panel reinforcement."

The seat frame 64 is a frame that supports, from below, a driver's seat 66 in the vehicle 12. The seat frame 64 corresponds to a "seat support member." Furthermore, the driver's seat 66 corresponds to a "front portion vehicle seat."

The seat frame 64 has a right and left pair of vertical portions 641 that extend in the up-down direction and horizontal portions 642 that extend rearward from upper end portions of the right and left vertical portions 641. Diagonal brace portions 643 diagonally bridge lower end portions of the vertical portions 641 and front-rear direction middle portions of the horizontal portions 642. Lower end portions of the vertical portions 641 are secured by fastening with bolts to the rear end portion of the driver's seat floor portion 46F and the seat cross member 62. Rear end portions of the horizontal portions 642 are secured to a later-described cross member 72 that is attached to up-down direction middle portions of a right and left pair of struts 68 erectly provided on the front end portion of the middle floor panel 47.

The right and left struts 68 are made of steel formed in the shape of a rectangular tube, for example, extend in the up-down direction, and are arranged side by side an interval apart from each other in the vehicle width direction. Plural passenger seats 70 are disposed on the rear side of the right and left struts 68. The plural passenger seats 70 are disposed side by side in the vehicle width direction and are secured to the right and left struts 68 via brackets or the like. Although the drawings do not show this, plural passenger seats are also provided in the rear portion of the cabin 42.

Plural cross members (only the cross member 72 is shown in the drawings as an example) are attached, at predetermined intervals apart from each other in the up-down direction, to the right and left struts 68. The right and left struts 68 and the plural cross members configure a partition wall 74 that partitions the driver's seat 66 (the front portion of the cabin 42) from the passenger seats 70 (the rear portion of the cabin 42).

The cross member 72 is made of steel formed in the shape of a rectangular tube, for example, extends in the vehicle width direction, and has the rear end portions of the horizontal portions 642 of the seat frame 64 joined to it. That is, the rear end of the seat frame 64 is secured to the struts 68 (the partition wall 74) via the cross member 72.

In this embodiment, the partition wall 74 is configured by the pair of struts 68 extending in the vehicle up-down direction, the plural cross members including the cross member 72 attached to the pair of struts 68 and extending in the vehicle width direction (the other cross members are not shown in the drawings), and panels (not shown in the drawings) attached to both sides of a frame member formed by the struts 68 and the cross members including the cross member 72, but it may also be formed by just a frame member omitting the panels, and may also be a partition wall formed from one sheet of sheet steel.

The struts 68 are fastened to the floor panel 44 (the front end portion of the middle floor panel 47) by attachment portions 80 on their lower ends and are fastened to a roof panel 84 by attachment portions 82 on their upper ends.

The range of the floor panel 44 from the rear end portion of the driver's seat floor portion 46F (at least including the section joined to the seat cross member 62) (see position D1 in FIG. 1) through the sloping portion 46R to the front end portion of the middle floor panel 47 (at least including the section fastened to the attachment portions 80 of the struts 68) (see position D2 in FIG. 1) corresponds to a "dash panel." Below, sometimes the floor panel in this range from position D1 to position D2 of the floor panel 44 is called a "dash panel 110."

Figure 3:
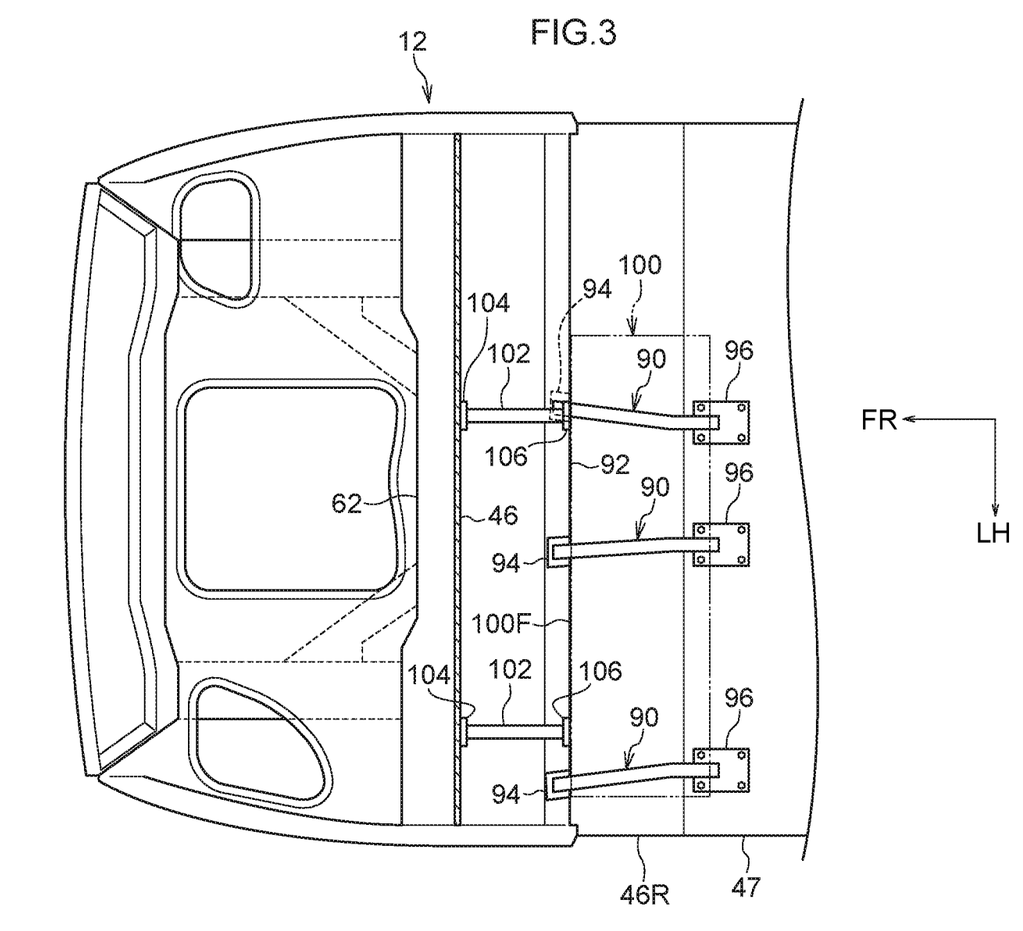
FIG. 3 is a plan view showing the arrangement of an autonomous driving kit supporting brackets and abutment rods in the front portion of the vehicle.

As shown in FIG. 3, on the sloping portion 46R of the front floor panel 46, three brackets 90 that are L-shaped when seen from the vehicle width direction (see FIG. 1) are disposed predetermined intervals apart from each other in the vehicle width direction.

Each bracket 90 has a horizontal portion 901 that extends in the vehicle front-rear direction and a vertical portion 902 that extends downward from the rear end of the horizontal portion 901. The front end of the horizontal portion 901 is fastened (secured) via a flange portion 94 to a step portion 92 of the sloping portion 46R. The lower end of the vertical portion 902 is fastened (secured) via a flange portion 96 to the front end portion of the middle floor panel 47. Because of this, the brackets 90 are secured to the top of the sloping portion 46R of the front floor panel 46 (the dash panel 110).

An autonomous driving kit (hereinafter called an "ADK") 100 is mounted on the horizontal portions 901 of the three brackets 90. The ADK 100 has an outer shape formed substantially in a rectangular prism shape and is disposed horizontally on the dash panel 110 as a result of its under-surface being supported by the brackets 90.

As shown in FIG. 2, the ADK 100 extends from the position of the rear portion 18R of the front side frame 18 on the left side in the vehicle width direction, under the seat frame 64 (the driver's seat 66), to the neighborhood of the rocker portion 48R of the front side member 48 on the right side. That is, part at the vehicle width direction middle portion of the ADK 100 is positioned under the seat frame 64.

A front surface 100F of the ADK 100 and the seat cross member 62 are interconnected by abutment rods 102. The abutment rods 102 extend in the front-rear direction, and front ends thereof are fastened (secured) via flange portions 104 through the sloping portion 46R to the rear surface of the seat cross member 62. Rear ends of the abutment rods 102 are fastened via flange portions 106 to the front surface 100F of the ADK 100. The abutment rods 102 correspond to "restraining members".

Action

The action of the vehicle front portion structure 10 configured in this way will now be described with reference to FIG. 1 to FIG. 3.

In the vehicle front portion structure 10, as shown in FIG. 1, the ADK 100 disposed via the brackets 90 on the upper portion of the sloping portion 46R of the front floor panel 46 (the dash panel 110) is positioned on the vehicle lower side of the seat frame 64 and is positioned in front of the partition wall 74 (the struts 68). That is, at least part of the ADK 100 is disposed in an area A (see the hatched section in FIG. 1 and FIG. 2) surrounded by the seat frame 64 made of steel pipes or sheet steel for example, the partition wall 74 (the struts 68), and the dash panel 110, so the vehicle front portion structure 10 is provided with an ability to protect the ADK 100 at the time of a frontal impact to the vehicle 12.

In particular, the front end portion of the seat frame 64 (the lower end portions of the vertical portions 641) is secured to the front end portion of the dash panel 110, and the rear end portion of the seat frame 64 (the rear end portions of the horizontal portions 642) is secured via the cross member 72 to the struts 68 (the partition wall 74). Furthermore, the struts 68 (the partition wall 74) are fastened (secured) via the attachment portions 80 on their lower ends to the rear end portion of the dash panel 110.

That is, the seat frame 64, the dash panel 110, and the partition wall 74 are connected (secured) to each other to form the area A, so they are strong, and damage to the ADK 100 is prevented or inhibited irrespective of deformation of the vehicle front portion at the time of a frontal impact to the vehicle 12. That is, the vehicle front portion structure 10 is provided with an ability to protect to the ADK 100.

The ADK 100 is disposed via the brackets 90 in the area A that is dead space above the dash panel 110, under the driver's seat 66 (the seat frame 64), and in front of the partition wall 74 in the cabin 42, so the ADK 100 can be disposed in the vehicle 12 without reducing space used by users in the vehicle 12.

That is, in the vehicle front portion structure 10, by disposing the ADK 100 in the area A (see the hatched area A in FIG. 1 and FIG. 2) surrounded by the seat frame 64, the partition wall 74 (the struts 68), and the dash panel 110, the ADK 100 can be disposed in the vehicle 12 without reducing space used by users, and the vehicle front portion structure 10 is provided with an ability to protect the ADK 100 at the time of a frontal impact to the vehicle 12.

Furthermore, the seat cross member 62 that is provided extending in the vehicle width direction so as to interconnect the front side members 48, which extend in the vehicle front-rear direction on both sides in the vehicle width direction, is joined to the lower side of the front end portion of the dash panel 110 to which the front end portion of the seat frame 64 (the lower end portions of the vertical portions 641) is secured, so the strength with which the seat frame 64 and the dash panel 110 are supported is improved, and the ability to protect the ADK 100 is provided.

Moreover, the struts 68 configuring the partition wall 74 have on their lower ends the attachment portions 80 that are fastened (secured) to the front end portion of the middle floor panel 47 of the floor panel 44 (the rear end portion of the dash panel 110) and have on their upper ends the attachment portions 82 that are fastened (secured) to the roof panel 84. That is, the partition wall 74 (the struts 68) are secured to the floor panel 44 (the dash panel 110) and the roof panel 84, so the strength of the partition wall 74 is improved even more. That is, the ability to protect the ADK 100 at the time of a frontal impact to the vehicle 12 is improved even more.

Moreover still, the ADK 100 is disposed in a predetermined position in the area A via the brackets 90 attached to the sloping portion 46R (the dash panel 110). For this reason, the ADK 100 is inhibited from being vibrated by input from the road surface compared to a case where it is directly mounted on the dash panel 110.

Furthermore, by installing the brackets 90 that are L-shaped when seen in a vehicle side view on the sloping dash panel 110 (the sloping portion 46R), the horizontal portions 901 on which the ADK 100 is installable can be formed. That is, by using the brackets 90, the ADK 100 can be horizontally installed in the area A.

Furthermore, the abutment rods 102 that extend in the front-rear direction are provided between the rectangular front surface 100F of the ADK 100 and the rear surface side of the rectangular tube-like seat cross member 62, so the ADK 100 can be prevented or inhibited from moving forward at the time of a frontal impact to the vehicle 12.

Other

In this embodiment, part (the vehicle width direction middle part) of the ADK 100 is disposed in the area A (see the hatched section in FIG. 1 and FIG. 2) surrounded by the seat frame 64, the partition wall 74 (the struts 68), and the dash panel 110, but, in some embodiments, the entire ADK 100 may be disposed in the area A. In this case, the ability to protect the ADK 100 at the time of a frontal impact to the vehicle 12 is improved even more.

Furthermore, in this embodiment, the lower end portions of the struts 68 are fastened to the floor panel 44 (the dash panel 110) and the upper end portions of the struts 68 are fastened to the roof panel 84, but the struts 68 are not limited to this. The upper end portions of the struts 68 may also not be secured to the roof panel 84.

The floor panel 44 is configured by the front floor panel 46, the middle floor panel 47, and the rear floor panel, and the rear end of the front floor panel 46 is bonded to the front end of the middle floor panel 47, but the floor panel 44 is not limited to this. The floor panel 44 is not particularly limited so long as the section corresponding to the dash panel 110 is formed.

An embodiment has been described above, but the disclosure can of course be implemented in various ways in a range that does not depart from the scope of the disclosures.

What is claimed is:

1. A vehicle front portion structure comprising:
    a dash panel separating a power unit compartment provided at a lower portion of a vehicle front portion from a cabin provided on a vehicle upper side and a vehicle rear side of the power unit compartment, the dash panel includes a slopped portion having a step portion, and the dash panel slopes downward from a vehicle front side to the vehicle rear side;
    a partition wall having a lower end portion secured to a vehicle rear end portion of the dash panel and extending from the lower end portion in a vehicle upward direction to divide the cabin into a front portion and a rear portion;
    a front portion vehicle seat disposed on a vehicle upper side of the dash panel;
    a seat support member supporting the front portion vehicle seat from a vehicle lower side and having a front end portion secured to the dash panel and a rear end portion secured to the partition wall;
    brackets having an L-shape, with a horizontal portion that extends in a vehicle front-rear direction and a vertical portion that extends downward from a rear end of the horizontal portion, a front end of the horizontal portion is secured to a top of the step portion at the vehicle front-rear direction middle position of the dash panel, and a lower end portion of the vertical portion is secured to the vehicle rear end portion of the dash panel; and
    an autonomous driving unit supported by the brackets, at least part of the autonomous driving unit being disposed in an area surrounded by the dash panel, the partition wall, and the seat support member, and the autonomous driving unit controlling autonomous driving of the vehicle.

2. The vehicle front portion structure of claim 1, wherein an upper end portion of the partition wall is configured to be secured to a roof panel.

3. The vehicle front portion structure of claim 1, further comprising:
    a dash panel reinforcement configured to interconnect, in a vehicle width direction, vehicle skeletal members extending in a vehicle front-rear direction on both sides in the vehicle width direction, the dash panel reinforcement supporting a vehicle front end portion of the dash panel; and
    restraining members extending in the vehicle front-rear direction and having front end portions secured to the dash panel reinforcement and rear end portions secured to the autonomous driving unit.

4. The vehicle front portion structure of claim 2, further comprising:
    a dash panel reinforcement configured to interconnect, in a vehicle width direction, vehicle skeletal members extending in a vehicle front-rear direction on both sides in the vehicle width direction, the dash panel reinforcement supporting a vehicle front end portion of the dash panel; and
    restraining members extending in the vehicle front-rear direction and having front end portions secured to the dash panel reinforcement and rear end portions secured to the autonomous driving unit.

5. The vehicle front portion of claim 3, wherein the restraining members are elongated rods, the rear end portions of the restraining members are secured to a front surface of the autonomous driving unit, and the front end portions of the restraining members are secured to the dash panel reinforcement such that a portion of the dash panel is disposed between the front end portions of the restraining members and a rear surface of the dash panel reinforcement in the vehicle front-rear direction.

6. The vehicle front portion of claim 4, wherein the restraining members are elongated rods, the rear end portions of the restraining members are secured to a front surface of the autonomous driving unit, and the front end portions of the restraining members are secured to the dash panel reinforcement such that a portion of the dash panel is disposed between the front end portions of the restraining members and a rear surface of the dash panel reinforcement in the vehicle front-rear direction.

7. A vehicle front portion structure comprising:
- a dash panel separating a power unit compartment provided at a lower portion of a vehicle front portion from a cabin provided on a vehicle upper side and a vehicle rear side of the power unit compartment;
- a partition wall having a lower end portion secured to a vehicle rear end portion of the dash panel and extending from the lower end portion in a vehicle upward direction to divide the cabin into a front portion and a rear portion;
- a front portion vehicle seat disposed on a vehicle upper side of the dash panel;
- a seat support member supporting the front portion vehicle seat from a vehicle lower side and having a front end portion secured to the dash panel and a rear end portion secured to the partition wall;
- an autonomous driving unit, at least part of the autonomous driving unit being disposed in an area surrounded by the dash panel, the partition wall, and the seat support member, and the autonomous driving unit controlling autonomous driving of the vehicle;
- a dash panel reinforcement configured to interconnect, in a vehicle width direction, vehicle skeletal members extending in a vehicle front-rear direction on both sides in the vehicle width direction, the dash panel reinforcement supporting a vehicle front end portion of the dash panel; and
- restraining members that are elongated rods extending in the vehicle front-rear direction, rear end portions of the restraining members are secured to a front surface of the autonomous driving unit, and front end portions of the restraining members are secured to the dash panel reinforcement such that a portion of the dash panel is disposed between the front end portions of the restraining members and a rear surface of the dash panel reinforcement in the vehicle front-rear direction.

\* \* \* \* \*